(12) United States Patent
Jung et al.

(10) Patent No.: US 6,810,667 B2
(45) Date of Patent: Nov. 2, 2004

(54) BYPASS VALVE SYSTEM OF A TURBO-CHARGED ENGINE

(75) Inventors: Byung Hwan Jung, Seoul (KR); Whan Yong Sim, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 5 days.

(21) Appl. No.: 10/308,483

(22) Filed: Dec. 3, 2002

(65) Prior Publication Data

US 2003/0106539 A1 Jun. 12, 2003

(30) Foreign Application Priority Data

Dec. 6, 2001 (KR) .................................. 10-2001-77085

(51) Int. Cl.[7] .......................... F02B 33/44; F02B 33/00
(52) U.S. Cl. ...................... 60/611; 123/564; 123/559.1; 251/61; 251/61.3
(58) Field of Search ........................... 60/611; 123/564, 123/559.1; 251/61, 61.3

(56) References Cited

U.S. PATENT DOCUMENTS

| | | | | |
|---|---|---|---|---|
| 2,365,650 A | * | 12/1944 | Shaw et al. ................. | 251/61.3 |
| 3,322,142 A | * | 5/1967 | Baumann ..................... | 251/61 |
| 4,434,775 A | * | 3/1984 | Yoshimura et al. ......... | 123/564 |
| 4,512,153 A | * | 4/1985 | Kawabata et al. ........... | 60/611 |
| 5,054,508 A | * | 10/1991 | Benjey ....................... | 251/61.3 |
| 5,190,016 A | * | 3/1993 | Takeda ........................ | 123/564 |
| 5,347,972 A | * | 9/1994 | Sandou et al. ............... | 123/564 |

FOREIGN PATENT DOCUMENTS

| | | | | | |
|---|---|---|---|---|---|
| JP | 01177410 A | * | 7/1989 | .......... | F02B/33/00 |
| JP | 08061073 A | * | 3/1996 | .......... | F02B/37/10 |
| JP | 2002221050 A | * | 8/2002 | .......... | F02B/37/00 |
| KR | 2003005469 A | * | 1/2003 | .......... | F02M/35/10 |

* cited by examiner

Primary Examiner—Thai-Ba Trieu
(74) Attorney, Agent, or Firm—Morgan Lewis & Bockius LLP

(57) ABSTRACT

The bypass valve system of a turbo-charged engine includes a compressor coupled between an air intake and a cylinder. The system also includes a bypass valve coupled in a bypass passage between an intake manifold and the air intake. The bypass valve is configured to selectively open and close the bypass passage in response to a change in pressure downstream of the compressor. A throttle position sensor is configured to generate an electric signal that is proportional to a degree of opening of a throttle valve. Also, an electronic control unit (ECU) is configured to output an activating signal when a sudden closure of the throttle valve is detected based on the electric signal. Finally, a solenoid valve is configured to supply pressure downstream of the compressor to the bypass valve when it receives the activating signal.

8 Claims, 4 Drawing Sheets

BYPASS VALVE SYSTEM OF A TURBO-CHARGED ENGINE

FIELD OF THE INVENTION

The present invention relates to a bypass valve system of a turbo-charged engine for bypassing excessively compressed intake air into an air filter wherein excessive compression of the intake air is generated by sudden closing of a throttle valve.

BACKGROUND OF THE INVENTION

In general, engine output is proportional to engine displacement. However, even engines with the same displacement can have significantly varied output, based on the amount of air supplied to cylinders of the engine. It is well known that the more air supplied to a cylinder, the higher the increase in engine power output. Such technique increasing engine power by controlling the intake air supplied into the engine cylinders is called "super-charging".

A turbo-charger is one type of super-charging system that is widely used for increasing the output of an engine by super-charging. Conventional turbo-charge systems include a bypass valve. Conventional bypass valves, however, are disadvantageous in that the opening/closing operation responding to the sudden change of pressures is delayed due to a mechanical operating system. As a result, the compressed intake air reversibly flows into the compressor continuously generating pulsatory noises in the compressor. In addition, the bypass valve generates a squeezing sound when the highly pressurized intake air is suddenly discharged. Further, the intake air violently discharged from the opening vibrates an air filter making a resonant noise.

For the foregoing reason, there is a need for a bypass valve system of a turbo-charging engine that can reduce the noise generated from a compressor, an air filter, and a bypass valve while addressing the drawbacks associated with the prior art.

SUMMARY OF THE INVENTION

The present invention provides a bypass valve system that reduces pulsatory noises generated by impact of reversed intake air against a compressor. The bypass valve system bypasses the reversed intake air into an air intake, such as an air filter, before the reversed intake air reaches the compressor.

Furthermore, the present invention provides a bypass valve system that significantly reduces vibrating sound generated by impact of highly compressed intake air against an air filter. This may be achieved according to an embodiment of the invention by opening a bypass valve before the intake air is excessively compressed.

In addition, the present invention provides a bypass valve system that significantly reduces squeezing sounds from the bypass valve. Again, this may be achieved by opening a bypass valve before the intake air is excessively compressed.

Further, the present invention provides a bypass valve system, in which the force of a spring can be readily determined because there are only two factors to be considered in designing the operation of the bypass valve, namely the force of the spring and the pressure downstream of the compressor.

The bypass valve system according to an embodiment of the present invention includes a bypass valve having a diaphragm, which selectively opens and closes a bypass passage in response to a change of pressure downstream of a compressor. A throttle position sensor generates an electric signal in accordance with the degree that a throttle valve is opened. An ECU detects a sudden closure of the throttle valve based on said electrical signal generated from said throttle position sensor and then outputs an activating signal to a solenoid valve. The solenoid valve supplies the pressure downstream of the compressor into the bypass valve in response to the activating signal.

In particular, the bypass valve preferably comprises a main body, a diaphragm, an upper chamber, an operating rod, a spring, a closing element, an inlet and outlet. The upper chamber communicates with downstream of the compressor through a passage having the solenoid valve therein. A proximal end of the operating rod is fixed to the diaphragm, and a distal end is connected to a spring disposed at the lower part of the main body. The closing element is securely fixed to the operating rod. The inlet and outlet are through what the intake air is bypassed. The closing element selectively controls the flow of intake air by moving towards and away from the upper chamber in accordance with the movement of the diaphragm and the operating rod.

For example, when the pressure downstream of the compressor supplied into the upper chamber becomes larger than the force of the spring, the closing element moves away from the upper chamber and opens the bypass passage in accordance with downward movement of the diaphragm. Further, the ECU determines whether the throttle valve is suddenly closed or not, based on a comparison of a predetermined value and a value of time derivative of the electric signal generated by the throttle position valve.

According to another embodiment of the invention there is also provided a method for bypassing excessively compressed intake air in a turbo-charged engine system. A degree of opening of a throttle valve is measured and an electric signal generated that is proportional to the degree of opening. This electric signal is then transmitted to an electronic control unit (ECU). It is then determined whether a throttle valve has been suddenly closed based on the electric signal. Excessively compressed intake air is then bypassed from an intake manifold to a air intake before it reaches a compressor of the turbo-charged engine system. This may be achieved by sending an activating signal to a solenoid valve fluidly coupled between downstream of a compressor and a bypass valve, thereby opening the solenoid valve to allow pressure downstream of the compressor to be supplied to the bypass valve. This opens the bypass valve to allow excessively compressed intake air to be discharged into the air intake.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF PREFERRED EMBODIMENTS

Figure 1:
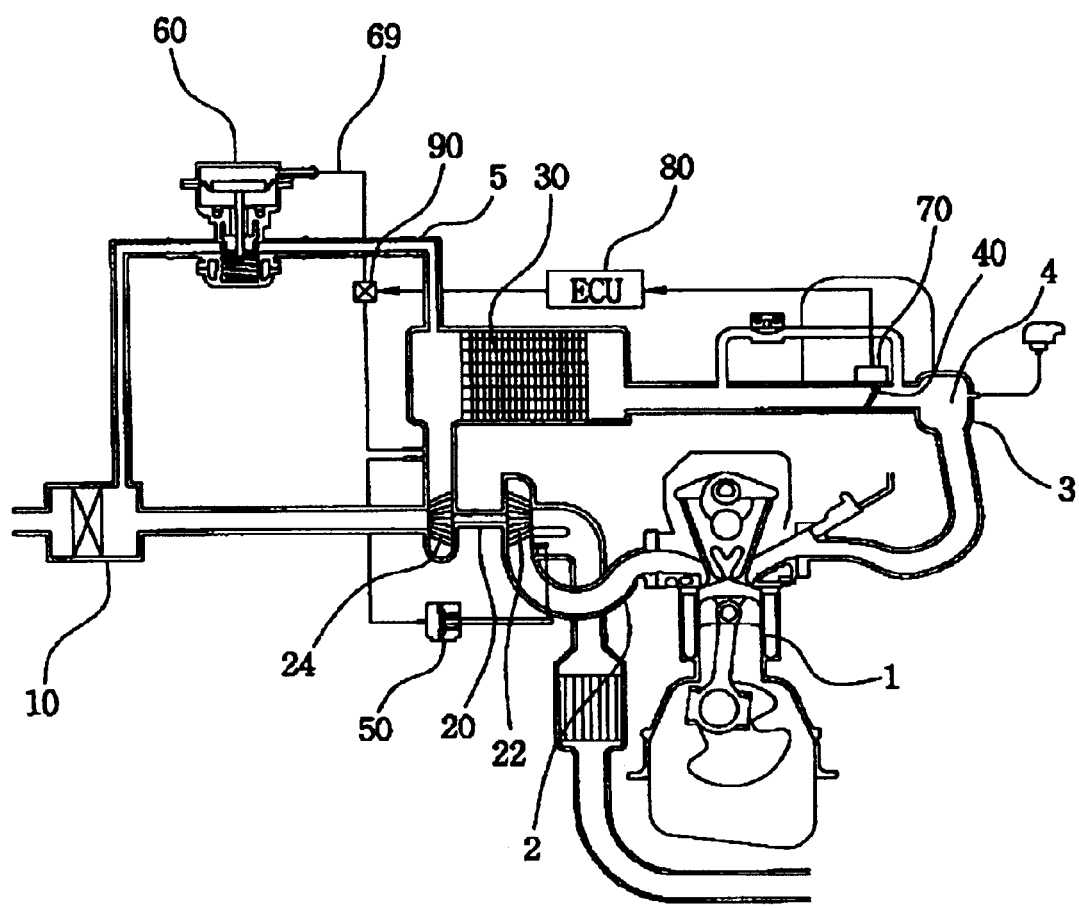
FIG. 1 is a schematic view of a bypass valve system, according to the present invention.
Figure 2:
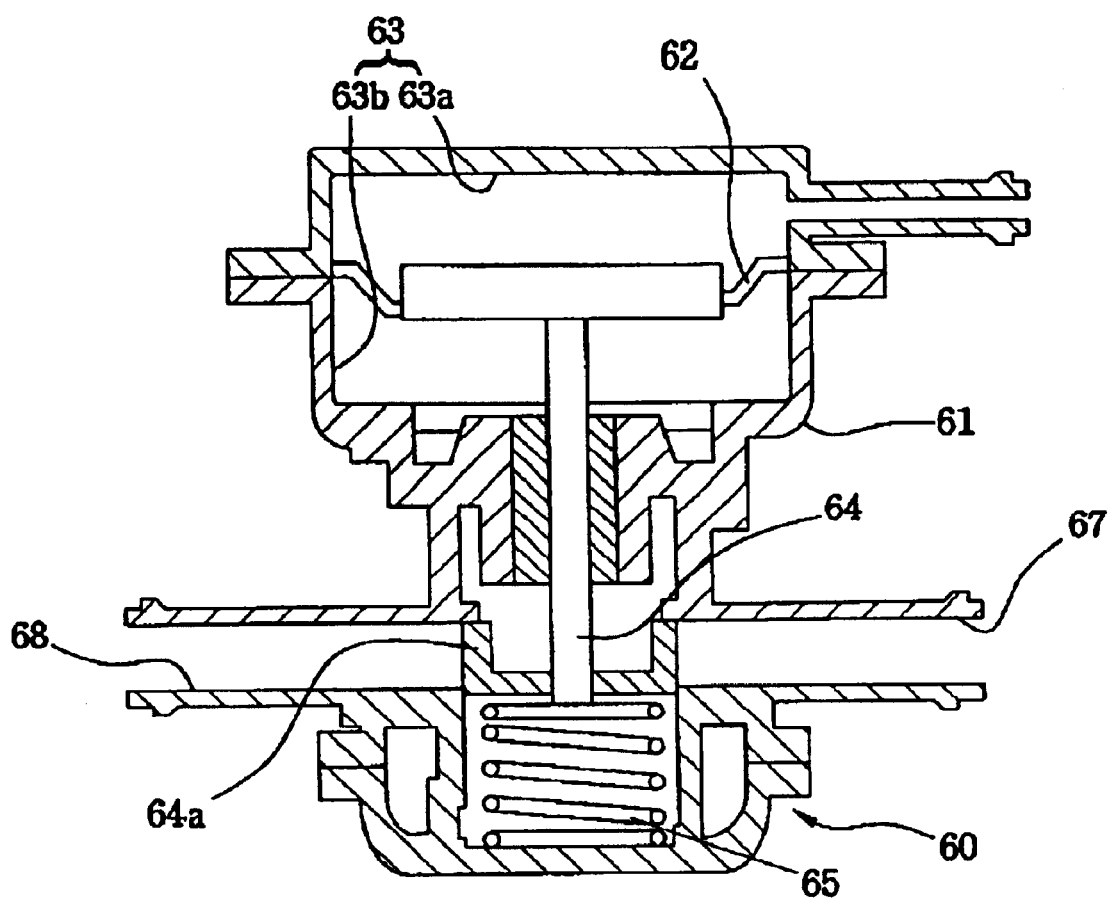
FIG. 2 is a sectional view of a bypass valve of the present invention.
Figure 3:
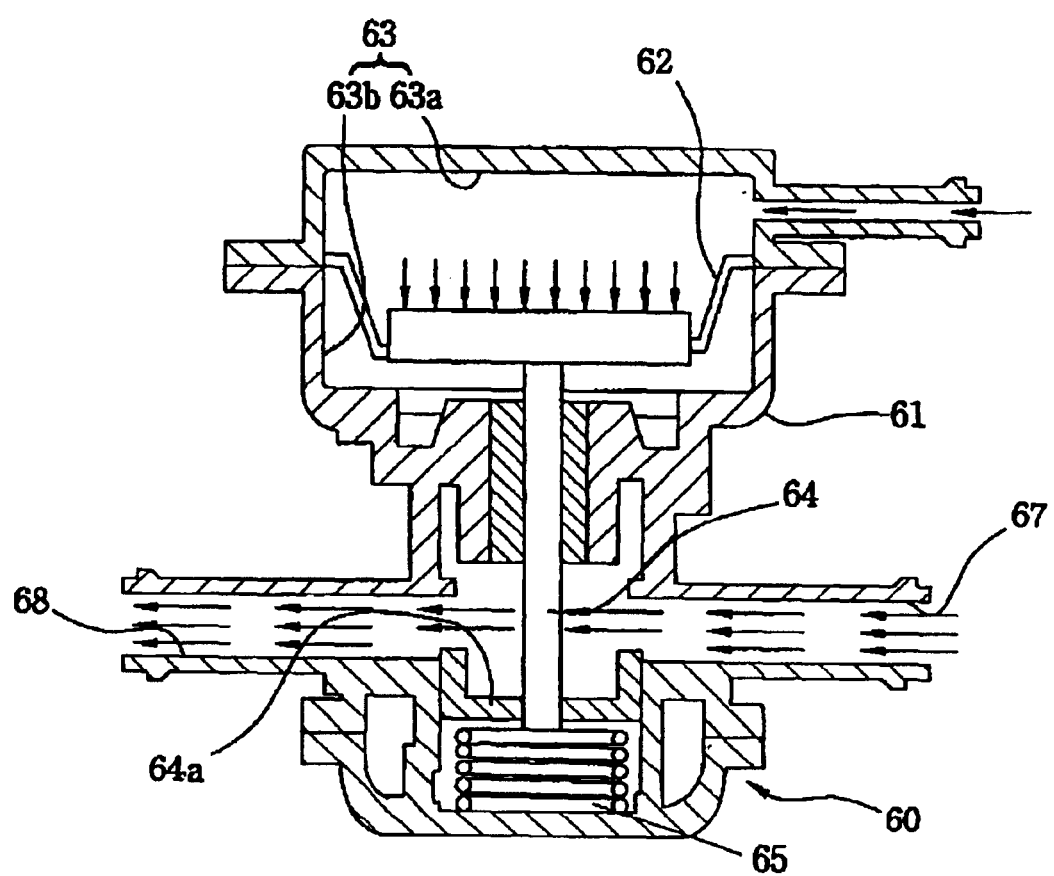
FIG. 3 is a sectional view showing an open state of a bypass valve of the present invention.

As shown in FIGS. 1, 2 and 3, a turbo-charged engine is provided with a bypass valve 60 comprising a diaphragm 62 and an operating rod 64. The bypass valve 60 is mechanically operated by the difference in pressure between pressure a surge tank 4 and the pressure downstream of a compressor 24. The surge tank 4 is disposed between a throttle valve 40 and an intake manifold 3.

It is also difficult to determine an appropriate force of spring in such bypass valves.

With reference to FIG. 1, in general, a preferred embodiment of the present invention comprises a turbo-charger 20 consisting of a turbine 22 and a compressor 24 for super charging intake air into the cylinders 1 of an engine. The compressor 24 is preferably disposed between the air filter 10 and the cylinders 1. An intercooler 30 is also provided for cooling the intake air pressurized by compressor 24. A throttle valve 40 controls the supply of intake air into the cylinders. An intake manifold 3 is also connected to the cylinders.

A waste gate 50 and a bypass valve assembly are provided to prevent the intake air from being excessively compressed. The bypass valve includes a bypass valve 60 for opening/closing a bypass passage 5 in response to the change of the pressure downstream of the compressor 24. Also provided are a throttle position sensor 70 that is configured to generate electric signals in accordance with the position of the throttle valve 40. An ECU 80 is provided for determining whether the throttle valve 40 suddenly closes, or not, based on electric signals generated from said throttle position sensor 70. If the throttle valve 40 suddenly closes, an activating signal is generated. Also provided is a solenoid valve 90 configured to introduce the pressure downstream of the compressor 24 into the bypass valve 60 in response to the activating signal from the ECU 80.

The bypass valve 60 of the present invention is disposed on a bypass passage 5 through which intake air is bypassed when excessive compression of the intake air occurs due to a sudden closure of the throttle valve 40. When the bypass valve 60 is opened, the intake air is discharged into the air filter 10 through the bypass passage 5 instead of flowing into the compressor 24.

As shown in FIG. 2, a pressure chamber 63 is formed at an upper part of a main body 61 of the bypass valve 60. A diaphragm 62 is installed in the bypass valve 60. The diaphragm 62 divides the pressure chamber 63 into an upper chamber 63*a* and a lower chamber 63*b*. The upper chamber 63*a* is set up to communicate with downstream of the compressor 24 through a passage 69 (FIG. 1). Further, the bypass valve 60 is provided with an operating rod 64 with a proximal end securely fixed to the bottom surface of the diaphragm 62 and a distal end secured to a spring 65 disposed at the lower part of the main body 61. In addition, a closing element 64*a* is integrally installed at the lower part of the operating rod 64, whereby the passage of the intake air in the bypass valve 60 is selectively opened or closed by the closing element's position. An inlet 67 and an outlet 68 are provided for connecting the bypass valve 60 with the bypass passage 5.

The closing element 64*a* is configured to move along the longitudinal axis of the operating rod 64 in accordance with movement of the diaphragm 62. Movement away from the diaphragm 62 opens the passage in the bypass valve 60. Such movement occurs when the pressure of the upper chamber 63*a* becomes bigger than the force of the spring 65 as shown in FIG. 6. It will be appreciated by those skilled in the art that the flow of the intake air through the bypass valve 60 is maintained airtight unless the pressure of the upper chamber 63*b* becomes larger than the force of the spring 65.

A throttle position sensor (TPS) 70 (FIG. 1) is configured to detect the current position of the throttle valve 40 (FIG. 1) and generate an electric signal based on the detected position of throttle valve 40. It is well known that the throttle valve 40 is mechanically and/or electrically connected to an accelerator pedal (not shown). Force applied to the accelerator pedal controls the position of the throttle valve 40. An electric signal generated from the throttle position sensor 70 is transferred to the ECU 80, whereby the ECU 80 determines from the signal whether the throttle valve 40 was suddenly closed.

Figure 4:
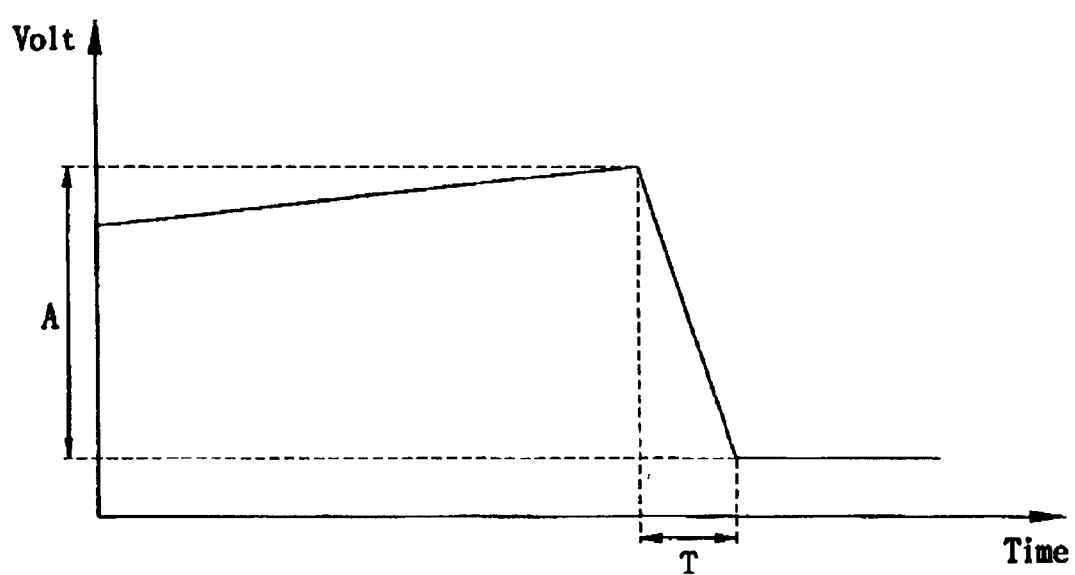
FIG. 4 is a graph showing the variation of a voltage being introduced from the throttle position sensor into the electronic control unit (ECU).

FIG. 4 is a graph showing the variation of an electric signal (voltage) being sent by the throttle position sensor to the ECU. The voltage is gently increased in proportion to the force applied to the accelerator pedal. However, when the force applied to the accelerator is suddenly released, the voltage is sharply decreased. A derivative of the electric signal (voltage) is then used as an indication in determining whether the throttle valve 40 was suddenly closed.

Returning to FIG. 1, if the ECU 80 determines that the throttle valve 40 is suddenly closed, i.e., by a derivative of the electric signal being more/less than a predetermined value, the ECU 80 generates an activating signal to operate a solenoid valve 90. The solenoid valve 90 is installed on a passage 69 connecting the upper chamber 63*a* of the bypass valve 60 and downstream of the compressor 24 in order to selectively introduce the pressure downstream of the compressor 24 into the bypass valve 60. Therefore, upon receipt of the activating signal from the ECU 80, the solenoid valve 90 opens the passage 69, and thus the pressure downstream of the compressor 24 is introduced into the upper chamber 63*a* of the bypass valve 60. If this pressure is large enough to overcome the force of the spring, the bypass valve is opened.

The operation of a preferred embodiment will now be described in detail. While the engine is accelerating, the bypass valve 60 of the present invention is maintained closed. The position of the throttle valve 40 is continuously measured by the throttle position sensor 70 that generates an electrical signal in accordance therewith and transmits the electrical signal to the ECU 80. When a driver suddenly releases the force applied to the accelerator pedal, the ECU 80 notices a sudden movement of the throttle valve 40 by analyzing the electric signal from the throttle valve sensor 70. Namely, if the value of time derivative of the electrical signal (voltage) exceeds a predetermined value, the ECU 80 determines that a sudden closure of the throttle valve 40 occurred. Accordingly, the ECU 80 generates an activating signal which is transmitted to the solenoid valve 90. Subsequently, the solenoid valve 90 is opened and the pressure downstream of the compressor 24 is introduced directly into the upper chamber 63*a* of the bypass valve 60.

When the pressure in the upper chamber 63*a* is greater than the force of the spring 65, the bypass valve 60 opens. The intake air is thereby discharged into the air filter 10 through the bypass passage 5. Even though the throttle valve 40 is closed by an action of a driver, it should be appreciated that the solenoid valve 90 is maintained closed if the value of time derivative of the electric signal (voltage) detected by the throttle position sensor is smaller than the predetermined value.

As described above, the present invention provides a bypass valve system that detects a sudden movement of the throttle valve 40 which causes a reversal of the intake air. The solenoid valve 90 is then opened based on the movement of the throttle valve 40, thereby discharging the intake air into the air filter 10 by opening the bypass valve 60 before the excessively compressed intake air reaches the compressor 24.

Accordingly, it is possible to reduce the time lag of operation of the bypass valve 60 in response to a sudden movement of the throttle valve 40. Because it takes less time for the reversed intake air to reach the compressor 24, the bypass valve 60 of the present invention, which responds rapidly, can bypass the reversed intake air before it reaches the compressor 24.

Furthermore, because the bypass valve is opened well before the intake air is excessively compressed, any squeezing sound in the bypass valve can be significantly reduced.

What is claimed is:

1. A method for bypassing excessively compressed intake air in a turbo-charged engine system, comprising:
   determining, by a throttle valve position sensor that a throttle valve has been suddenly closed, wherein said determining is performed by analyzing a value of time derivatives of an electric signal (voltage) generated from the throttle valve position sensor; and
   bypassing excessively compressed intake air from an intake manifold to a air intake before said compressed intake air reaches a compressor of a turbo-charged engine system.

2. The method according to claim 1, further comprising, before said determining,
   measuring a degree of opening of a throttle valve;
   generating an electric signal that is proportional to said degree of opening; and
   transmitting said electric signal to an electronic control unit (ECU), where said determining is based on said electric signal.

3. The method according to claim 2, wherein said bypassing further comprises:
   sending an activating signal to a solenoid valve fluidly coupled between downstream of a compressor and a bypass valve;
   opening said solenoid valve using said activating signal to allow pressure downstream of said compressor to be supplied to the bypass valve;
   opening the bypass valve to allow excessively compressed intake air to be discharged into the air intake.

4. A method for bypassing excessively compressed intake air in a turbo-charged engine system, comprising:
   measuring a degree of opening of a throttle valve by a throttle valve position sensor;
   generating a signal that is proportional to said degree of opening;
   transmitting said signal to an electronic control unit;
   determining, in the electronic control unit, when said throttle valve has been suddenly closed by analyzing a value of time derivatives of the signal generated from the throttle valve position sensor;
   sending an activating signal to a solenoid valve fluidly coupled downstream between a compressor and a bypass valve;
   opening said solenoid valve using said activating signal to allow pressure downstream of said compressor to be supplied to a bypass valve; and
   opening the bypass valve to allow excessively compressed intake air to be discharged to an air intake.

5. A bypass valve system of a turbo-charged engine for discharging reversed intake air, generated by a sudden closure of a throttle valve, into an air filter through a bypass passage before the intake air reaches the compressor, the bypass valve system comprising:
   a bypass valve having a diaphragm configured to selectively open and close the bypass passage in response to a change in a pressure downstream of a compressor;
   a throttle position sensor configured to generate an electric signal based on a degree of opening of a throttle valve;
   an electronic control unit (ECU) configured to output an activating signal when a sudden closure of said throttle valve is detected based on said electric signal from said throttle position sensor;
   wherein the ECU determines when a sudden closure of the throttle valve occurs by analyzing whether a value of time derivative of an electric signal (voltage) generated from the throttle position sensor exceeds a predetermined value; and
   a solenoid valve configured to supply the pressure downstream of the compressor into said bypass valve in response to said activating signal.

6. The bypass valve system according to claim 5, wherein said bypass valve comprises:
   a main body;
   an upper chamber fluidly coupled to downstream of the compressor via the solenoid valve;
   a diaphragm separating said upper chamber from a lower chamber;
   an operating rod having a proximal end coupled to said diaphragm and a distal end coupled to a spring disposed near a lower part of the main body;
   a closing element coupled to said operating rod;
   an inlet and an outlet through which intake air is bypassed, such that in use the closing element opens a passage between said inlet and said outlet in accordance with a movement of the diaphragm away from the upper chamber.

7. A bypass valve system of a turbo-charged engine, comprising:
   a compressor coupled between an air intake and a cylinder;
   a bypass valve coupled in a bypass passage between an intake manifold and said air intake, where said bypass valve is configured to selectively open and close said bypass passage in response to a change in pressure downstream of said compressor;
   a throttle position sensor configured to generate an electric signal that is proportional to a degree of opening of a throttle valve;
   an electronic control unit (ECU) configured to output an activating signal when a sudden closure of said throttle valve is detected based on said electric signal;
   wherein the ECU determines when a sudden closure of the throttle valve occurs by analyzing whether a value of time derivative of an electric signal (voltage) generated from the throttle position sensor exceeds a predetermined value; and
   a solenoid valve configured to supply pressure downstream of said compressor to said bypass valve when said solenoid valve receives said activating signal.

8. The bypass valve system according to claim 7, wherein said bypass valve comprises:
   a main body;
   an upper chamber fluidly coupled to downstream of the compressor via the solenoid valve;
   a diaphragm forming a wall of said upper chamber;
   an operating rod having a proximal end coupled to said diaphragm and a distal end coupled to a spring disposed near a lower part of the main body;
   an inlet and an outlet through which intake air is bypassed;
   a closing element coupled to said operating rod, and configured for selectively opening and closing a passageway between said inlet and said outlet in accordance with a movement of the diaphragm away from said upper chamber.

* * * * *